Patented July 8, 1941

2,248,071

UNITED STATES PATENT OFFICE 2,248,071

PLASTIC POLYMER COMPOSITIONS

Harold W. Fisher, Cranford, N. J., assignor to Standard Oil Development Company, a corporation of Delaware No Drawing. Application June 22, 1937, Serial No. 149,698

3 Claims. (Cl. 260—41)

This invention relates to new and improved plastic hydrocarbon polymer compositions and methods of making same and more particularly it relates to improved compositions containing plastic substantially saturated solid aliphatic iso-olefin polymers having a molecular weight greater than about 3,000, as determined by the viscosity method described in Staudinger's "Die Hochmolekulare Verbindungen."

According to the present invention, it has been found that a tremendous improvement in the properties of such polymers is effected by incorporating therewith a substantial amount of carbon black. The invention may be illustrated by a composition consisting essentially of 90% iso-butylene polymer having an average molecular weight of about 80,000, and about 10% of finely-divided carbon black. The invention will be described more in detail further on.

Although the preparation of the polymer itself is not per se part of the present invention, it will be described briefly in order that the invention may be better understood. The process will be described as particularly applied to the polymerization of isobutylene, although other olefins having a similar chemical structure and capable of polymerizing to a very high molecular weight linear type polymer with short alkyl side chains may also be used. Isobutylene is polymerized in the presence of a volatile inorganic halide, particularly boron fluoride, at temperatures below −10° C., such as at about −50° C. or even as low as −100° C. The reaction is preferably carried out in the presence of a suitable solvent for the isobutylene, such as some of the liquefied normally gaseous hydrocarbons, for instance, propane, ethylene, etc. The resulting polymer which is recovered after evaporation of the solvent by release of pressure and warming to room temperature and then washing with water or dilute caustic soda or otherwise purified to remove any residual catalyst, is a substantially colorless, plastic solid having an average molecular weight range from about 3,000 up to 500,000 or so, although the conditions are preferably regulated so as to produce a polymer having an average molecular weight of about 15,000 as representing the lower range, or about 80,000 as a medium molecular weight, or about 200,000 as representing the extremely high molecular weight polymers. The product should preferably contain less than 0.1% and preferably not more than .01% of inorganic salt impurity. It is particularly important in preparing the extremely high molecular weight polymer that the starting materials should be free from sulfur compounds and other substances which act as poisons to the polymerization of isobutylene.

If desired, the polymerized product may be separated into fractions for different molecular weights, either by selective extraction or solution and precipitation using solvents, such as ethane, propane, naphtha, benzene, acetone-benzine, etc., at the proper temperature to make the desired separation. In this way the polymers having any particular desired molecular weight range may be separated from those having higher or lower molecular weights.

Although it is preferred to use boron fluoride as the catalyst, one may also use dry aluminum chloride, phosphorus tri-fluoride, phosphorus penta-fluoride, etc., or other active inorganic halides, although these may not give as good results as the boron fluoride.

The polymer having a molecular weight in the lower range, i. e. from about 3,000 to 25,000 has somewhat of a tendency toward what is called "cold flow"; although it does not soften appreciably on heating as do paraffin wax, bituminous materials and other waxy or plastic substances, yet upon standing for any substantial length of time it will tend to "flow" very slowly but perceptibly. This low molecular weight product is also very tacky. On the other hand the polymers having substantially higher molecular weights, such as 80,000 to 100,000 or 200,000 or more, have relatively little tendency toward "cold flow" and are dry and not tacky to the touch. They also possess considerable "snap."

These polymers are all substantially saturated in respect to hydrogen because the only double bond present in the molecule is relatively insignificant in view of all of the rest of the molecule which is entirely saturated and "free from double bonds." Therefore, although these polymers, especially those of high molecular weight, are somewhat rubbery in physical nature, yet they are not very amenable to the ordinary hardening by vulcanization with sulfur as can be applied to rubber and similar unsaturated materials.

The plastic solid polymers of isobutylene are also valuable by reason of their water proof character and their great resistance to chemical action, such as attack by acids, alkalies, salts, etc., or oxidation by air or chemical oxidizing agents. However, contrary to the case of rubber, instead of hardening or cracking when exposed to light, isobutylene polymers tend to soften by depolymerization or some such phenomenon.

The chief object of the present invention is to make these plastic isobutylene polymers still more valuable by increasing their toughness and resistance to compression by incorporating therewith a substantial amount of carbon black. The most remarkable fact, however, is that by so doing the durability of the polymers is also improved due to the increased resistance of the composition against light or ultra-violet rays having any tendency to depolymerize the polymer. Another object of the invention is to improve the physical properties mentioned without at the same time reducing the resistance of the polymer to chemical action.

In carrying out the present invention, carbon black is mixed with the hydrocarbon either before, during, or after polymerization and if done after the evaporation of the solvent (used in the polymerization process) the mixing is preferably accomplished by a kneading machine, although a pair of steel rollers, such as those used in a typical rubber mill, may also be used. The carbon black to be used is preferably lamp black because it can be obtained in a state of very fine subdivision, although under some circumstances coarser grades may be used.

The amount of carbon black to be used may vary under a fairly wide range depending largely upon the molecular weight of the polymer and the fineness of the carbon black used, as well as the particular use to which the composition is to be applied. However, in general, the composition may contain about 1-50% of carbon black if the product is to be used in sheet form or is to be extruded or otherwise manipulated under conditions requiring substantial plasticity. Under these circumstances the amount of carbon black should preferably be between 5-30% using the lower range, i. e. about 5-15% or 20% when the carbon black is extremely fine and the larger range, i. e. 15-30% when the carbon black is very coarse. When the composition is to be subjected to molding under pressure for the production of substantially rigid articles a much larger amount of carbon black should be used, usually between the approximate limits of 30-80% or more, although generally about 40-60% will be sufficient. The larger the amount of carbon black used the more pressure will be required for the molding. This pressure may range, for instance, from 100 to 10,000 pounds per square inch.

It is interesting and in fact very surprising that the isobutylene polymer will tolerate considerably more carbon black than ordinary rubber. Although the exact reasons for this phenomenon are not well understood, it is believed due to the higher wetting power of the polymer.

In addition to the carbon black it may also be desirable under some circumstances to add small amounts of other materials, for instance, plasticizers, such as waxes, oils, etc. or hardening agents, such as resins, pigments, rubber, etc.

Improved compositions prepared as described above are particularly useful for preparing extrudable articles, such as flexible hose or tubing or sheet material which may be used, for instance, as table covering, floor matting, etc., or cut out in the shape of gaskets or molded products, such as bottle stoppers, tiles, etc.

The following examples are given for the sake of illustration without intention of limiting the invention specifically thereto:

Example 1

5% of lamp black was kneaded into 95% of isobutylene polymer having a molecular weight of about 80,000. The composition was much better suited to calendering and sheeting than the polymer without the lamp black.

Example 2

The test in Experiment 1 was repeated using 10% of lamp black and then calendering was found to be still better and the resulting product was considerably tougher.

Example 3

30% of lamp black was mixed with 70% of the same polymer used in Example 1 and the resulting product was also suitable for calendering and sheeting and was still quite elastic and tough.

Example 4

60% of carbon black was mixed with 40% of isobutylene polymer of about 15,000 molecular weight and the mixture was compressed and molded into various shapes such as bottle stoppers, tiles, etc.

Example 5

20% of carbon black was mixed with 40% of isobutylene polymer having a molecular weight of about 80,000 and 40% of paraffin wax having a melting point of about 120° F. The mixing and resulting sheeting were effected at about 212° F.

Example 6

30% of carbon black was mixed with 50% of isobutylene polymer having a molecular weight of about 80,000 and 20% of ester gum (a normally hard brittle glycerol ester of rosin) and the resulting mixture was molded into articles of desired shapes.

It is not intended that the invention be limited by any of the specific examples given hereinabove or by any theories of the operation of the invention, but only by the appended claims in which it is intended to claim all novelty inherent in the invention as broadly as the prior art permits.

I claim:

1. A shaped substantially rigid article of manufacture composed of isobutylene polymers having an average molecular weight above about 15,000, and a substantial amount of carbon black sufficient to retard softening of the polymer when exposed to light and to make the article retain its shape.

2. A sheeted article made of the composition according to claim 1 and containing about 5 to 50% of carbon black.

3. A molded article made of the composition according to claim 1 and containing about 30 to 80% of carbon black.

HAROLD W. FISHER.